R. R. LAPOINTE & B. F. LEVY.
BROACHING MACHINE.
APPLICATION FILED MAR. 3, 1917.
1,296,535.
Patented Mar. 4, 1919.
2 SHEETS—SHEET 2.
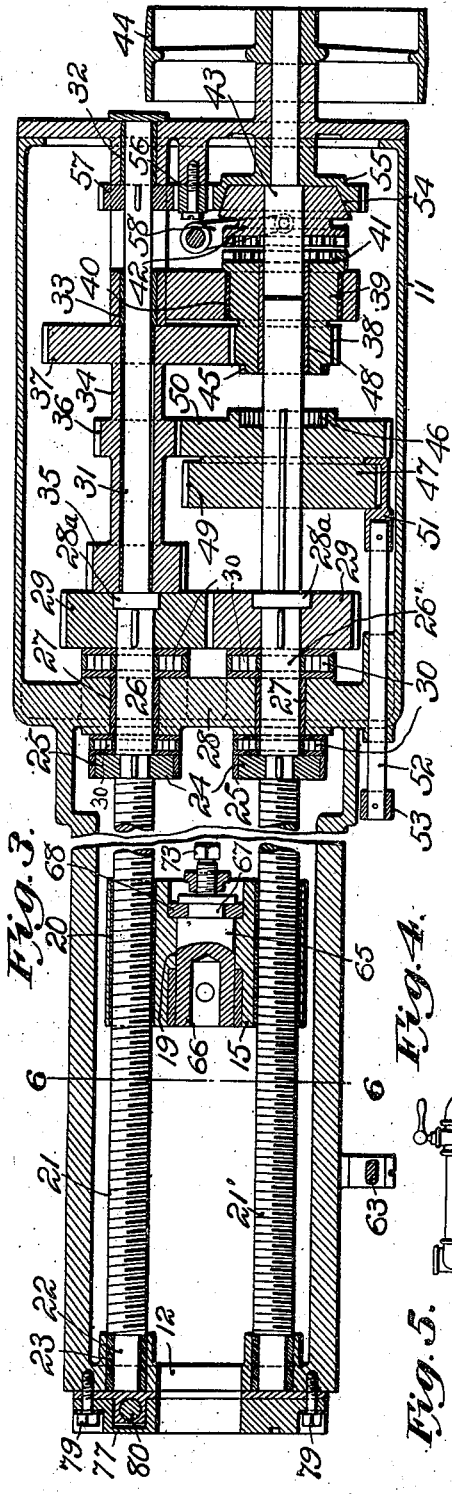
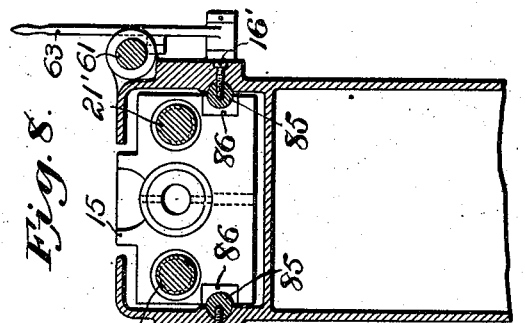
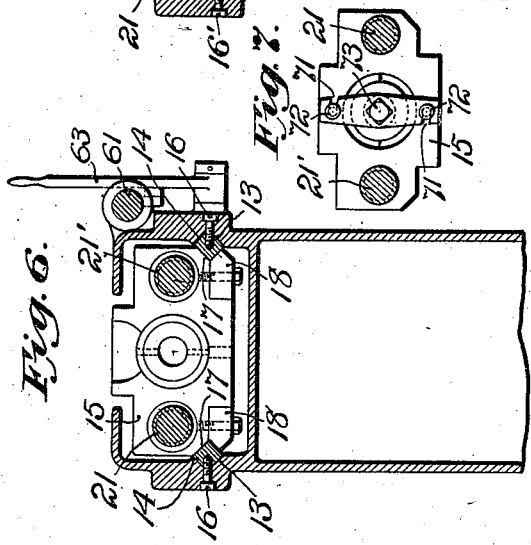
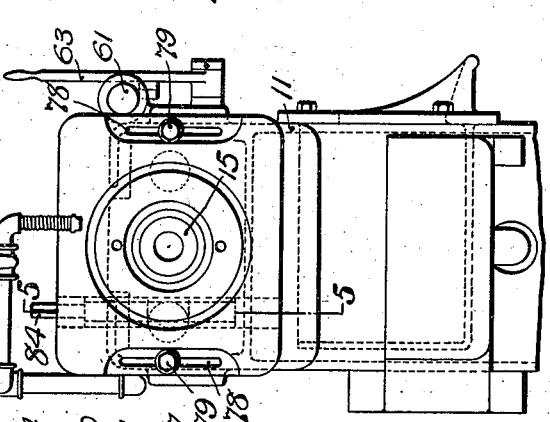

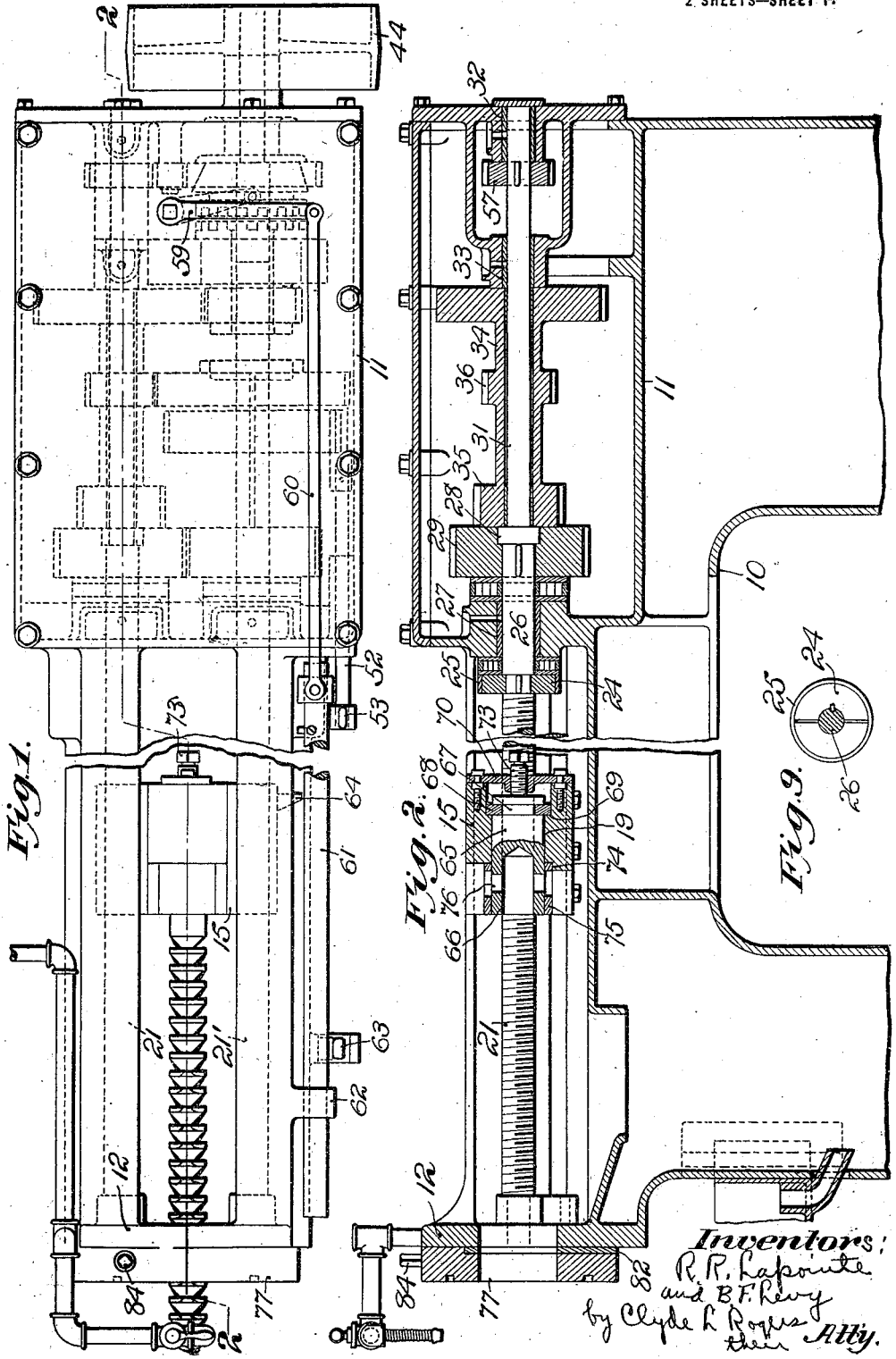

UNITED STATES PATENT OFFICE.

RALPH R. LAPOINTE, OF HUDSON, AND BENJAMIN F. LEVY, OF BOSTON, MASSACHUSETTS.

BROACHING-MACHINE.

1,296,535.  Specification of Letters Patent.  Patented Mar. 4, 1919.

Application filed March 3, 1917. Serial No. 152,413.

*To all whom it may concern:*

Be it known that we, RALPH R. LAPOINTE and BENJAMIN F. LEVY, citizens of the United States, and residents, respectively, of Hudson, in the county of Middlesex and Commonwealth of Massachusetts, and of Allston, Boston, in the county of Suffolk and Commonwealth of Massachusetts, have invented an Improvement in Broaching-Machines, of which the following description, in connection with the accompanying drawings, is a specification, like characters on the drawings representing like parts in each of the several views.

This invention relates to broaching machines of the draw-cut type wherein a relatively long broaching tool is operated with a drawing or pulling movement by suitable operating mechanism to produce a desired cut in a work piece at a single operative movement. In machines of this type it has hitherto been customary to draw the broach through the work for its operative movement by a single relatively large and massive screw arranged in vertical alinement with the broach, and as nearly as may be in horizontal alinement therewith except for requirements as to vertical adjustment of the broach.

One prime object of the present invention is to provide operating mechanism for the broach, consisting in a plurality of relatively smaller screws engaged to operate the draw head of the broach and arranged in balanced relation to the axial line or center of the broach. For this purpose two such screws are shown engaged with the broach head at opposite sides of the broach receiving socket thereof, these screws being illustratively shown as rotatably driven instead of fixed as is the present usual practice. A further important object of the invention is to provide improved operating mechanism for the broach that is capable of a relatively wide range of speed changes, and is at the same time compact, reliable and powerful in operation. A still further object is to provide improved means for connecting the broach to its operating head whereby it is securely held and is also capable of quick and convenient assemblage and removal. A still further object is to provide improved means for effecting a relative transverse adjustment between the work and broach, this being done by a vertical adjustment of the face plate that holds the work and permitting the broach itself to be permanently located in horizontal alinement with the horizontally spaced apart operating screws therefor. A still further object is to provide improved means permitting quick and convenient assemblage and removal of the various parts including the operating screws. The foregoing and other objects and advantages of the invention will more fully appear from the following detailed description, and the distinctive features of novelty will be pointed out in the appended claims.

Referring to the drawings:

Figure 1 is a plan view of a broaching machine constructed in accordance with our invention;

Fig. 2 is a vertical section thereof approximately on line 2—2 of Fig. 1;

Fig. 3 is a horizontal median section through the machine;

Fig. 4 is a front end view;

Fig. 5 is a sectional detail on line 5—5 of Fig. 4;

Fig. 6 is a transverse section on line 6—6 of Fig. 3;

Fig. 7 is a fragmentary transverse section showing the rear end of the draw head in elevation;

Fig. 8 is a transverse section similar to Fig. 6 showing a modified form; and

Fig. 9 is a fragmentary detail of a screw engaging thrust collar.

The base or bed of the machine indicated at 10 may be of usual or suitable type having a housing 11 at its rear portion to receive the operating gearing and a vertical face 12 at its front end to receive a suitable face plate which in the present case is adjustably fitted thereon. The intermediate forward portion of this bed or base frame work is formed with lengthwise extending recesses 13 to receive guide rails 14 for the broach draw head 15, these recesses being shown in Fig. 6 as angular in cross-section and the rails being correspondingly shaped and drawn in to seat in these recesses by suitable screw bolts 16. In practice the recesses 13 may be cast in the bed frame or they may be machined therein, or they may be provided with machined seats at intervals babbitted or similarly held in place. The draw head 15 is recessed to receive the inwardly projecting corner portions of the rails 14 as seen at 17 and as shown it is rabbeted to receive gibs 18 forming the lower wall of the angular recesses 17, these gibs being in practice adjustable as required by suitable interposed shims or by filing thereof as required so as to make an accurate sliding fit of the draw head 15 on the rails 14. The broach draw head 15 is provided with a central bore 19 for the broach holder to be presently further described and at each side of this bore and in horizontal alinement therewith the draw head is also bored to receive stationary nut bushings 20 through which are threaded the operating screws 21, 21'. The screws 21, 21' have reduced forward ends 22 journaled in bearing bushings 23 fitted into and fixed in the forward end of the broach frame, these bushings being as shown a little larger than the maximum diameter of the screws so that the screws are capable of insertion and removal through the bores of these bushings when said bushings are taken out. Both of the screws 21, 21' have at the inner extremity of the threaded portions thereof split collars 24 fitted on reduced portions thereof, these split collars being encircled and held in place by rings 25. Said screws have plane or shaft extensions 26, 26' respectively journaled in bearings 27 of the frame, the frame being for this purpose provided with a relatively massive transverse web 28. Just back of the frame web 28, the screw shafts 26, 26' have keyed thereon and fitting against suitable backing shoulders 28ᵃ, intermeshing gears 29, these gears being of the same size so that the screws are thereby made to rotate synchronously in opposite directions, the screws 21, 21' being accordingly one with right hand threads and the other with left hand threads so as to both act on the draw head 15 to move it in the same direction. Suitable anti-friction bearings 30 shown as of the roller bearing type are interposed between the gears 29 and the frame web 28 and also between the collars 24 and said frame web, the former set of bearings taking the operative thrust and thereafter being heavier and stronger. The screw shaft 26 is provided with a reduced extension 31 extending to the rear end of the frame where it has suitable bearing 32 therein, along with an intermediate frame bearing 33. Loosely journaled on the shaft extension 31 is a gear sleeve 34 equipped with a series of spaced apart gears 35, 36, 37 of diverse sizes. The largest one of these gears 37, at one end of said sleeve, is in driven engagement with a pinion 38 constituting part of a gear block 39 journaled at 40 in a web of the frame work, this gear block having at its inner end a clutch face 41 engageable by a coöperative clutch face at one side of a clutch head 42 slidingly keyed on a short shaft 43 journaled at the inner end of the frame work and as shown in axial alinement with the extension 26'. The shaft 43 constitutes the prime drive shaft of the machine and has fixed at a projecting end thereof suitable means such as a belt pulley 44 to receive driving impulse. The gear block 39 is also formed at its outer end with a male clutch member or gear 45 engageable with an internal clutch member or gear 46 on a gear block 47 slidably keyed on the shaft extension 26' which for this purpose is extended so that its end has bearing in the bore of the gear block 39 as seen at 48. The gear block 47 is composed of two gears 49, 50 of diverse sizes selectively engageable with the pinions 35, 36 respectively on the gear sleeve 34 according to the position of adjustment of the gear block 47 or said gear block may be moved to a third position at the extreme right in Fig. 3 where both said sets of gears are disengaged and the clutch members 45, 46 brought into engagement. The gear block 47 is adjustable for this purpose by a bracket member 51 engaging the same, this bracket member being carried at the end of a slide rod 52 fitted in the frame work and equipped at its outer end with an operating handle 53 pivoted thereto, this having usually in practice a graduated quadrant or the like (not shown) to determine the adjusted setting thereof. It may now be understood that with the clutch members 41, 42 engaged, the screws 21, 21' may be driven directly by engagement of the clutch members 45, 46 upon shifting the gear block 47 to the extreme right, or the drive may be through the reducing gear 37, 38 connected up with either of the gear pairs 35, 49, or 36, 50, this permitting the operative movement of the broach draw head 15 to be effected at any one of three varied rates at will. For returning the draw head and broach after an operative stroke, the clutch head 42 is formed at its outer side with a clutch face shown as a friction cone 54 engageable with a coöperative clutch face formed in a gear 55 rotatably mounted on a reduced portion of the shaft 43 and through an intermediate gear 56 journaled to the frame, driving a pinion 57 keyed on the shaft extension 31, this drive by reason of the relatively larger size of the gear 55 and the smaller size of the pinion 57 being at a higher rate than the highest or direct operative rate of movement and by reason of the intermediate 56 being in reverse direction. This reverse drive thus imparted to the screw 21 will be transmitted to the other shaft 21' through the meshing gears 29 in like manner as the several forward drives. For shifting the clutch head 42 a suitable swinging shifter arm 58 engaged therewith is provided, this shifter arm having rigid therewith and swinging on the same center an external arm 59 connected by a link 60 with a slide bar 61 fitted in ears 62 to extend alongside the machine where it may be equipped with an operating handle 63 pivoted thereto, this clutch controlling slide bar being also operable automatically by coöperative tappets 64 on the draw head 15 and said bar respectively.

An important feature of the invention has to do with improved means for securing the broach in its operating draw head, this being accomplished in the present embodiment in a manner so as to dispense with the screw thread connections heretofore usual which have been objectionable for the reason that having to stand considerable strain in the operative movement the threads must either be made so as to have only a loose fit with resulting play, or else encounter the difficulty of having the threads distorted or upset making removal and replacement difficult. According to the present improved construction the draw head is formed with a relatively large bore 19 centrally lengthwise therethrough, this bore being of a size to receive and have fitted therein the usual diameter of broach holder, that is, usually about three inches. A broach holder 65 shown as cylindrical in form and equipped with a socket 66 to receive the shank or tang of the broach, is fitted into this bore. This construction provides a strong and rigid support and engagement right at the end of the broach with the application of power in the most direct and efficient manner possible, the broach being directly between the two screws which exert the pull thereon and in the horizontal plane thereof so that all binding or unnecessary friction is eliminated. The broach holder 65 has a peripheral groove 67 near its rear end into which is fitted a hardened split collar 68, the outer portion of this collar having bearing against an annular shoulder 69 formed by an enlargement of the bore 19 at this point. Thus a backing is provided to receive the pull on the broach in operation. It will be noted that the diameter of the enlarged portion of the bore 19 back of the shoulder 69 is such as to receive and permit the snug fitting therein of the split collar 68 which is of a diameter enough larger than that of the holder 65 to afford the necessary strength. To keep the broach holder 65 from turning in the draw head and also to keep it from pushing back on the return stroke of the machine suitable means is provided shown as a strap plate 70 held to the end of the draw head 15 by having bayonet notches 71 thereof engaged by screws 72 set into the draw head, this strap plate having centrally fitted therethrough a clamp screw 73 adapted to be adjusted up to press against the end of the holder 65. To provide for cases where larger broach holders of greater than normal size have to be accommodated, the front end of the draw head 15 may be enlarged or counterbored as indicated at 74. When the machine is used with a broach holder of normal size this counterbore may have fitted therein a sleeve 75, which sleeve may be removed to permit the larger broach holder to be inserted directly into said enlarged counterbored portion when desired. The sleeve 75 as well as the end of the holder 15 is transversely slotted as seen at 76 to receive usual cotter or locking keys for connecting the broach to the broach holder in ordinary manner. Thus it will be noted that the present manner of mounting the broach holder in the draw head maintains the broach always central with respect to the direction of pulling draft and does away with the overhang usual with present types of machines. To avoid the necessity for any vertical adjustment of the broach which would bring it out of alinement with the center of pulling draft we provide a face plate mounted for vertical adjustment at the front end of the machine on the vertical face 12 of the frame thereof. For this purpose the face plate 77 is equipped with elongated vertical slots 78 through which pass bolts 79 for clamping the face plate in vertically adjusted position to the face 12 of the bed. For effecting such adjustment the face plate has swiveled therein a screw 80 engaging a fixed nut 81 carried by a plate member 82 secured by screws 83 or the like to the face 12 of the bed. Thus by turning the screw 80 from the squared projecting end 84 thereof the face plate may be vertically adjusted so that the work piece fitted thereon will be centrally and correctly positioned with respect to the broach.

In Fig. 8 is shown a modified form of the means for holding and guiding the draw head 15, this consisting in bars or rods 85 circular in cross-section in place of the rails 14, these rods being held in correspondingly shaped sockets of the frame by screws 16' or the like, and the draw head having wear blocks 86 set into recesses therein, said wear blocks formed to fit the rods 85 accurately, to position and correctly guide the draw head 15.

While as herein shown the operating screws are rotatable and coöperate with stationary nuts of the draw head, this in a broader aspect is to be understood as merely illustrative as are also the various detailed features shown to illustrate operative principles. The present embodiment is therefore to be understood as in all respects illustrative and not restrictive, and reference is therefore had to the appended claims rather than to the foregoing description to indicate the scope of the invention.

Having described our invention, what we claim as new and desire to secure by Letters Patent is:

1. A broaching machine, comprising a broach draw head, a plurality of operating screws engaged therewith at spaced apart points, and means for operating said screws in unison, said draw head having provision to receive and hold for operative movement the end of a broach substantially in a median line between said screws and in the horizontal plane thereof.

2. A broaching machine, comprising a broach draw head, a plurality of operating screws engaged therewith at spaced apart points, means for moving said draw head by the action of said screws with inward draw-cut operative strokes, said draw head having a bore intermediate said screws, and a broach holder fitted in said bore and held for operative movement with said draw head approximately in the horizontal plane of said screws.

3. A broaching machine, comprising a broach draw head having a slide way mounting for operative movement, a pair of screws engaging said draw head adjacent opposite sides thereof for inward draw-cut strokes, means for operating said screws in unison, said draw head having a hole therein intermediate said screws and substantially in the horizontal plane thereof, and a broach holder having a sliding fit into said hole and equipped with means for assembling it rigidly with said draw head for operative movement.

4. A broaching machine, comprising a broach draw head having a slide way mounting for operative movement, a plurality of spaced apart screws having operative engagement with said draw head, said draw head having a hole therethrough intermediate said screws and substantially in the horizontal plane thereof, and a broach holder having a sliding fit in said hole, said holder formed with a peripheral groove and a split collar engaging said groove and fitting against the shoulder of said draw head to assemble said holder with the draw head for operative movement.

5. A broaching machine, comprising a broach draw head having a slide way mounting for operative movement, a plurality of spaced apart screws having operative engagement with said draw head, said draw head having a hole therethrough intermediate said screws, a broach holder having a sliding fit in said hole, said holder formed with a peripheral groove and a split collar engaging said groove and fitting against the shoulder of said draw head to assemble said holder with the draw head for operative movement, and separate means for taking up looseness and clamping said holder rigid with said draw head against either of sliding or rotary movement.

6. A broaching machine, comprising a broach draw head having a slide way mounting for operative movement, operating mechanism engaged with said head at spaced apart points, said head having a passage therethrough intermediate said points, and a broach holder having a sliding fit in said passage, said holder having a peripheral groove with a collar engaging said groove and abutting against said head, and adjustable means carried by said head for pressing against said holder to take up looseness and clamp said holder rigid with said head.

7. A broaching machine, comprising a broach draw head having operating mechanism associated therewith, said draw head having a passage therethrough, a broach holder having an endwise sliding fit in said passage, and means for clamping said holder immovably to said draw head, said draw head having at a forward end thereof a counterbore enlarging said passage and with a removable sleeve endwise slidably fitted therein for the purpose stated.

8. A broaching machine, comprising a bed frame, a broach head slidably fitted thereto, and operating screws for said head journaled in said frame, the forward bearing of said screws being at the forward end of said frame and consisting in removable bushings fitted to passages in said frame, said bushings being of a size to permit removal of said screws through said passages upon removal of the bushings.

9. A broaching machine, comprising a horizontally extending bed frame, a broach draw head slidably fitted thereto for horizontal movement and equipped with means for holding a broach in a median line thereof, and a face plate for holding the work piece fitted for vertical adjustment at the front end of said bed frame whereby the work may be adjusted transversely of the broach and centered with respect to the broach without disturbing the alinement of said broach in said draw head.

10. A broaching machine, comprising a horizontally extending bed frame, a draw-cut broach mounted for operative movement lengthwise thereof and permanently alined for operation, and a face plate for holding the work fitted for vertical adjustment with provision for clamping the same in adjusted position at the front end of said bed frame whereby the work on said face plate may be adjusted transversely with respect to the broach and centered.

11. A broaching machine, comprising a broach operating head, a plurality of screws operatively connected thereto and geared directly together for synchronous rotation, and mechanism for operating said screws including change speed devices having elements selectively engageable to operate said screws together for moving said broach head at a selective range of speeds on its operative movement.

12. A broaching machine, comprising a broach draw head, a plurality of spaced apart and geared together screws operatively connected to said head, and mechanism for operating said screws including a change speed device having shiftable gear elements selectively engageable to drive said screws at any one of a series of selected speeds.

13. A broaching machine, comprising a broach draw head, two spaced apart and geared together screws operatively engaged therewith, each of said screws having a shaft extension with selectively engageable gear elements constituting a change speed device fitted thereon whereby said head may be operated at any one of a selective range of speeds.

14. A broaching machine, comprising a broach draw head, a plurality of spaced apart and geared together screws operatively engaged with said head, each of said screws having a shaft extension and change gear drive mechanism including a series of spaced apart gears of diverse sizes rotatably fitted on one of said shaft extensions, and a set of gears slidably keyed on the other of said shafts and selectively engageable with the first mentioned series of gears whereby said screws may be driven at any one of a range of selective speeds.

In testimony whereof, we have signed our names to this specification.

RALPH R. LAPOINTE.
BENJAMIN F. LEVY.

Copies of this patent may be obtained for five cents each, by addressing the "Commissioner of Patents, Washington, D. C."